United States Patent [19]
Murphy

[11] Patent Number: 5,577,340
[45] Date of Patent: Nov. 26, 1996

[54] FISHING HOOK ASSEMBLY

[76] Inventor: John J. Murphy, 705 W. Pine St., Lancaster, Wis. 53813

[21] Appl. No.: 489,154

[22] Filed: Jun. 9, 1995

[51] Int. Cl.⁶ .................................................. A01K 83/00
[52] U.S. Cl. ............... 43/43.2; 43/34; 43/42.41; 43/42.1; 43/35
[58] Field of Search .................... 43/44.2, 44.8, 43/34, 35, 36, 37, 43.4, 43.6, 43.2, 42.4, 42.41, 42.43, 42.1

[56] References Cited

U.S. PATENT DOCUMENTS

| | | | |
|---|---|---|---|
| 768,451 | 8/1904 | Hedlund | 43/35 |
| 2,406,912 | 9/1946 | Schwarzer | 43/36 |
| 2,896,355 | 7/1959 | Dean et al. | 43/35 |
| 4,217,721 | 8/1980 | Hershberger | 43/43.2 |
| 4,433,502 | 2/1984 | Steeve | 43/43.2 |
| 4,506,469 | 3/1985 | Calagui | 43/34 |
| 4,726,142 | 2/1988 | Tapley | 43/36 |
| 4,869,012 | 9/1989 | Brenholt | 43/43.2 |
| 4,934,092 | 6/1990 | Simmons et al. | 43/44.2 |
| 5,031,350 | 7/1991 | Rabideau | 43/43.4 |
| 5,035,076 | 7/1991 | Martin | 43/36 |
| 5,319,876 | 6/1994 | Vlahek | 43/43.4 |

FOREIGN PATENT DOCUMENTS

| | | | |
|---|---|---|---|
| 2481576 | 11/1981 | France | 43/43.2 |

*Primary Examiner*—Joseph J. Hail, III
*Assistant Examiner*—Darren Ark
*Attorney, Agent, or Firm*—Bernard J. Murphy

[57] ABSTRACT

A pair of mutually confronting fish hooks are spring-coupled at the shank ends thereof to define thereof a shielding loop which circumscribes the barbed and pointed ends of the hooks. Accordingly, the coupled hooks can be drawn through submerged obstructions without getting snagged on such. The so-coupled hooks are replacements for the barbed hooks of crankbaits, for example, and upon a fish striking the so modified crankbaits, the spring yields and exposes the barbed, pointed ends externally of the shielding loop. In an alternate embodiment, the spring-coupled or calipered hooks are confined within a sheathing, frog-simulating body, and in another embodiment, the hooks are sheathed in an expandable tube. Fish strikes, again, diminish the loop and dispose the barbed, pointed ends of the hooks at-the-ready for piercing the thin sheathing and lodging in the mouth of the fish.

1 Claim, 1 Drawing Sheet

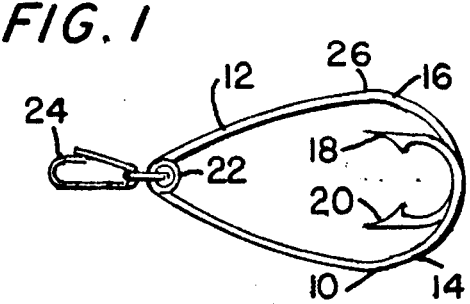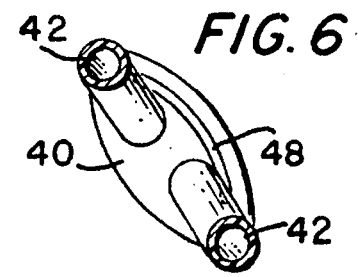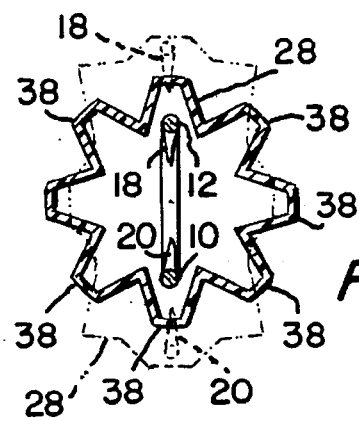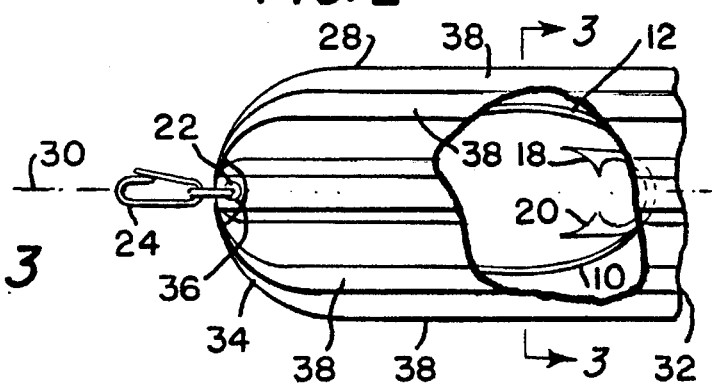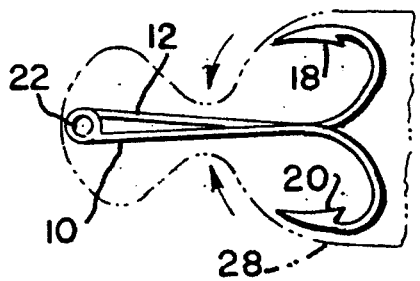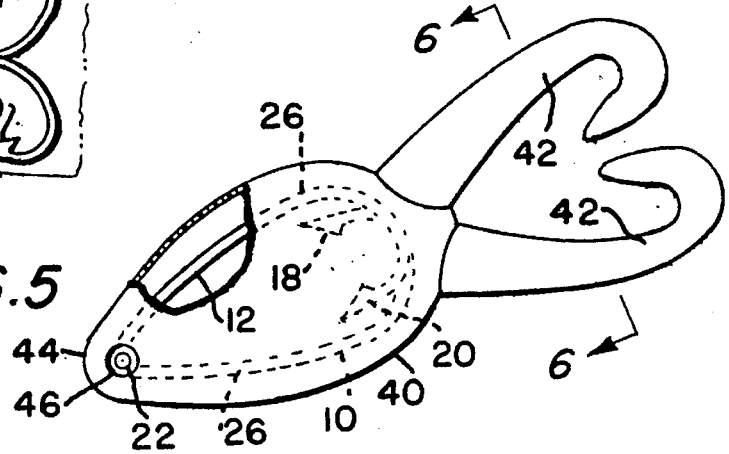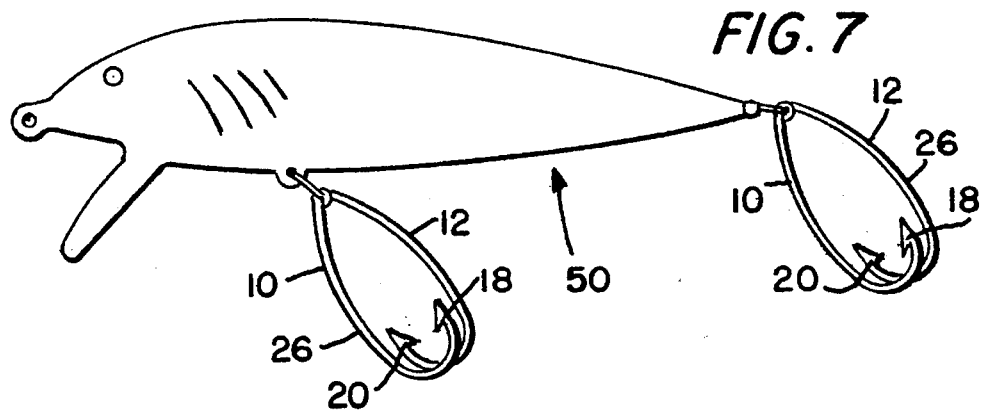

FISHING HOOK ASSEMBLY

This invention pertains to fish hooks, such as are used with the so-called "top water" baits or lures, and used dependingly coupled to crankbaits, i,e., lures which are especially configured for fishing in downed trees, stump fields, and the like.

Obviously, in order to catch a fish, the hook(s) must be exposed for that purpose. Now, the aforementioned "top water" baits or lures, typically, are designed to simulate frogs, for example, and the trailing, frog leg-type appendages thereof are used to shield and hide the bared hook. The hook is hid, of course, in order that the fish will attack the bait or lure without noticing the obscured hook, and the hook is shielded, as best can be done, to guard against it snagging weeds, lily pads, and such.

However cleverly the hooks thereof are positioned, the "top water" baits or lures do snag grasses, weeds, lily pads, and the like, unavoidably. Too, the crankbaits, with their freely suspended hooks, are regularly lost in the limbs and branches of downed trees, or are broken loose for getting hooked onto the trunk of a submerged tree. Such losses make the day's fishing both unhappy and expensive.

What has long been needed is some means for more surely obscuring and shielding the hook or hooks which, nonetheless, will be effective for catching fish. This need, specifically, is for a hook or hook assembly in which the pointed and barbed, working end thereof is apparently closed off from exposure to weeds, limbs, lily pads —and to fish, as well —but which, upon getting a fish strike, bares the hook, or renders the hook at-the-ready for the mouth of the fish. In this, the hook would move out from its shielding, to present the pointed, barbed end thereof to the fish, or would penetrate any shielding or covering, in response to the strike of the fish, to bare the working end to the fish.

It is an object of this invention to set forth a novel fishing hook assembly which meets the aforesaid, long sought need. Particularly, it is an object of this invention to set forth a fishing hook assembly comprising a given fishing-hook shank, with first and second, opposite ends, and having a given, U-turned, barbed hook at said first end thereof; means for shielding said hook from free exposure; and means resiliently coupling said shielding means to said second end of said shank; wherein said shielding means comprises another shank having first and second, opposite ends, and having a U-turned portion, at said first end of said another shank, which parallels and substantially juxtapositionally aligns with said hook.

Further objects of this invention, as well as the novel features thereof, will become apparent by reference to the following description, taken in conjunction with the accompanying figures, in which:

FIG. 1 is a plan view of an embodiment of the novel fishing hook assembly;

FIG. 2 is a side elevational view of an alternative embodiment of the invention, the same comprising a compliant tube which is partly cut away for illustrative purposes;

FIG. 3 is a cross-sectional view taken along section 3—3 of FIG. 2;

FIG. 4 is a depiction of the FIG. 2 and 3 embodiment of the invention, in which the sheathing tube is shown only in phantom, showing how the hooks thereof come to-the-ready upon the tube experiencing a fish strike;

FIG. 5 is a side elevational view of yet another embodiment of the invention in which the mutually-facing hooks are enclosed within a frog-simulating, hollow body, with a portion of the body being cut away to show a portion of a hook shank therewithin;

FIG. 6 is a cross-sectional view taken along section 6—6 of FIG. 5; and

FIG. 7 is a side elevational view of a crankbait which carries the first embodiment of the invention thereon.

As shown in FIG. 1, a pair of fish hook elements 10 and 12 are disposed in confronting relationship. Each element has a shank 14 and 16, and pointed, barbed, hook ends 18 and 20 at first ends of the shanks. The opposite, second ends of the shanks 14 and 16 are joined together by a coupling, coil spring 22. A clasp 24 is linked to the coil spring. The shanks 14 and 16 and the hook ends 18 and 20, due to the confronting relationship of the hook elements 10 and 12, define a loop 26 which circumscribes the pointed, and barbed ends of the hook ends 18 and 20. Consequently, the pointed, barbed ends are shielded from free exposure thereof. Upon a fish striking on the shanks 14 and 16, the spring 22 yields, the shanks close toward each other, reducing the width of the loop 26, and projecting the pointed, barbed ends outwardly thereof for embedding in the mouth of the fish.

While trolling, or casting and retrieving the confronting elements 10 and 12, self-evidently, the elliptical loop 26 shields the hook ends 18 and 20 from obstructions; they can be drawn through weeded, grassy, limbed environments without fear that the hook ends 18 and 20 will become snagged on any bottom growths or debris.

FIGS. 2 through 4 depict an embodiment of the invention in which the confronting elements 10 and 12 are sheathed in a compliant, hollow tube. 28. The tube 28 has a longitudinal axis 30, and is fully open at one, trailing end 32 thereof. The elements 10 and 12 are wholly confined within the tube 28. The leading end 34 of the tube 28 has an aperture 3S formed therein through which the coil of the spring 22, and the clasp 24 protrude.

The tube 28 has a plurality of axially-formed ribs 38 formed therein to render it expandable so that, when the shanks 14 and 16 close toward each other, to project the hook ends 18 and 20 outwardly, the tube 28 can expand, as shown in phantom in FIG. 3, to permit the outreach of the hook ends. FIG. 4 depicts how the hook ends 18 and 20 move into the at-ready disposition, upon a fish striking at the tube 28 and closing onto the shanks 14 and 16. With the mouth of the fish closing onto the tube, whereat the mutually-facing arrows are drawn, the pointed, barbed hook ends 18 and 20 are prepared to pierce the tube 28 and enter the mouth of the fish.

FIGS. 5 and 6 depict an embodiment of the invention in which the confronting, calipered-like elements 10 and 12 are sheathed in a hollow body 40 which, with trailing limbs 42, is configured to simulate a frog. The leading end 44 of the body has a throughgoing hole 46 which aligns with the coil of the spring 22. An attaching, linking clasp 24 (not shown here) can be attached to the spring coil through the hole 46. Across the rear of the body 40, as shown in FIG. 6, is a slit 48, the same being provided to accommodate the insertion of the spring-coupled elements 10 and 12 into the body 40.

FIG. 7 is a side elevational view of a typical crankbait 50 which has been modified to accept the spring-coupled elements 10 and 12. The typical crankbait has depending and trailing therefrom open, bared hooks. As priorly noted, the bared hooks are susceptible of snagging on submerged obstructions and, as a consequence, they snap free of the line and are lost to the fisherman. It is a teaching of this invention to remove the bared hooks, and replace them with the calipered-like, spring-coupled elements 10 and 12. So modified, the crankbait 50 can be drawn with impunity through the submerged obstructions. However, upon a fish striking onto the crankbait 50, it will move the hook ends 18 and 20 of one of the attached units out of the shielding loops 26, and get hooked.

While I have described my invention in connection with specific embodiments thereof, it is to be clearly understood that this is done only by way of example, and not as a limitation to the scope of the invention, as set forth in the objects thereof, and in the appended claims.

I claim:

1. A fishing hook assembly, comprising:

a pair of fishing hooks, each having first and second, opposite ends, and having only (a) a U-turned, barbed hook at said first end thereof, and (b) a substantially straight shank extending from said barbed hook thereof to said second end thereof; and a coil spring having a pair of free ends; wherein said second ends of said pair of fishing hooks are integral with said free ends of said spring, one of said second ends being integrated with one of said free ends, and the other of said second ends being integrated with the other of said free ends;

said U-turned, barbed hooks are mutually interfacing, with one thereof facing a given direction, and the other thereof facing an opposite direction;

said U-turned, barbed hooks are substantially juxtapositionally disposed to define a loop theretogether and therewithin;

said spring has a coil; and means sheathingly enclosing said shanks, U-turned, barbed hooks, and said free ends of said spring; wherein said enclosing means comprises a compliant tube having two, opposite ends;

one end of said tube is fully open, and the opposite end of said tube has an aperture formed therein; and only said coil protrudes outwardly from said tube via said aperture.

* * * * *